United States Patent
Lim et al.

(10) Patent No.: US 10,554,072 B1
(45) Date of Patent: Feb. 4, 2020

(54) INITIATING COMMANDS FOR IN-PACKAGE DEVICE BY LIGHT-ENERGY

(71) Applicant: Amazon Technologies, Inc., Seattle, WA (US)

(72) Inventors: James (Jimmy) Robert Lim, San Jose, CA (US); Yuting (Tim) Yeh, Sunnyvale, CA (US); David Wang, Santa Clara, CA (US); Poon-Keong Ang, Cupertino, CA (US); Erik Avy Vaknine, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 413 days.

(21) Appl. No.: 14/632,550

(22) Filed: Feb. 26, 2015

(51) Int. Cl.
| | |
|---|---|
| H02J 7/35 | (2006.01) |
| G06F 1/3206 | (2019.01) |
| H02S 40/36 | (2014.01) |
| G06F 1/32 | (2019.01) |
| G06F 1/3203 | (2019.01) |
| H02J 3/38 | (2006.01) |
| H02J 7/00 | (2006.01) |

(52) U.S. Cl.
CPC ............... H02J 7/35 (2013.01); G06F 1/32 (2013.01); G06F 1/3203 (2013.01); G06F 1/3206 (2013.01); H02J 7/355 (2013.01); H02S 40/36 (2014.12); H02J 3/383 (2013.01); H02J 7/0042 (2013.01)

(58) Field of Classification Search
CPC ......... H02J 7/355; H02S 40/36; G06F 1/3206
USPC ...................................................... 713/323
See application file for complete search history.

(56) References Cited

U.S. PATENT DOCUMENTS

| | | | | |
|---|---|---|---|---|
| 5,528,233 A | * | 6/1996 | Hansell ................. | G08C 23/04 340/870.02 |
| 6,917,723 B1 | * | 7/2005 | Tamburrini ........ | G06K 7/10851 382/317 |
| 2001/0038453 A1 | * | 11/2001 | Jung ........................ | G01J 3/02 356/419 |
| 2003/0105847 A1 | * | 6/2003 | Jennery ..................... | G06F 8/65 709/223 |
| 2008/0006762 A1 | * | 1/2008 | Fadell ................... | G01J 1/4204 250/201.1 |
| 2013/0113302 A1 | * | 5/2013 | Jeong ..................... | H02B 15/00 307/117 |
| 2015/0009144 A1 | * | 1/2015 | Veygman .............. | G06F 1/3206 345/158 |
| 2015/0069918 A1 | * | 3/2015 | Trattler .............. | H05B 33/0872 315/151 |

(Continued)

FOREIGN PATENT DOCUMENTS

EP          1739522 A1  *  1/2007  ........... G06F 1/3203

*Primary Examiner* — Richard Isla
*Assistant Examiner* — Manuel Hernandez
(74) *Attorney, Agent, or Firm* — Lee & Hayes, P.C.

(57) ABSTRACT

A system and method of using light-energy to communicate with a packaged computing device is described. In some embodiments, an optical detector of the computing device stored in a container receives light energy through a light-transparent window of the container. In some embodiments, the light energy is used to charge a battery of the computing device while the computing device is in the container. In some embodiments, a pre-defined pattern of light pulses is used to transition the computing device between a sleep state and a wake state while the computing device is in the container.

20 Claims, 6 Drawing Sheets

(56) References Cited

U.S. PATENT DOCUMENTS

| | | | |
|---|---|---|---|
| 2015/0200623 A1* | 7/2015 | Kang | H02S 40/32 320/101 |
| 2015/0287844 A1* | 10/2015 | Sainoh | H01L 31/02167 136/251 |
| 2016/0117908 A1* | 4/2016 | Ongyanco | H04B 10/116 340/641 |
| 2016/0190863 A1* | 6/2016 | Ogasawara | G04G 19/00 368/47 |
| 2016/0202116 A1* | 7/2016 | Haensgen | G01J 1/44 250/552 |
| 2017/0075411 A1* | 3/2017 | Goldsmith | G06F 1/3296 |

* cited by examiner

INITIATING COMMANDS FOR IN-PACKAGE DEVICE BY LIGHT-ENERGY

BACKGROUND

Portable computing devices such as, for example, e-readers and tablet computers, continue to increase in popularity. Because these devices are typically hand-held, both size and weight contribute to a positive or negative user experience. One characteristic that impacts both device size and weight is the size of the battery. Accordingly, devices are being manufactured with ever smaller batteries.

While a smaller battery has the benefit of smaller size and lighter weight, reduced battery life can negatively impact a user experience, both when the user initially obtains the device (e.g., the device battery may not be sufficiently charged when the user receives the device) and during ongoing use of the device. For example, when a user first obtains the device, it is preferable for the out-of-the-box experience to provide enough battery life to turn on the device, install updates on the device, and use the device for a short while before needing to charge the battery.

BRIEF DESCRIPTION OF THE DRAWINGS

The detailed description is set forth with reference to the accompanying figures. In the figures, the left-most digit of a reference number identifies the figure in which the reference number first appears. The use of the same reference numbers in different figures indicates similar or identical items. A reference number having a parenthetical suffix (as in "104(1)" or "112(a)") identifies a species of the feature represented by the general reference number (e.g., "104" or "112"); further, use of the general reference number without a parenthetical suffix (as in "104" or "112") identifies the genus or any one or more of the species.

DETAILED DESCRIPTION

Introduction

An electronic device, such as a hand-held computing device, having an integrated light-energy charging unit (or being connected to a light-energy charging unit), such as a solar charging unit, solar panel, or solar cell array, can provide an improved user experience by charging the device battery using energy harvested through the light-energy charging unit, resulting in longer battery life while the device is being used. Furthermore, the user experience upon initially receiving the device can also be improved if the device is packaged such that the light-energy charging unit is able to harvest energy and thus charge the device battery while the device is packaged for storage at a fulfillment center or retail store.

In an example implementation, prior to user purchase, a hand-held computing device is packaged in a box or other container that includes an integrated light-transparent window. While the hand-held computing device is in the package, light can enter through the light-transparent window, enabling the solar charging unit to harvest light energy, which is used to charge the device battery. In an example implementation, light can also be used to transition the device between a sleep state and a wake state. For example, a pre-defined pattern of light pulses can be used to communicate a command to wake the device from a sleep state. A wireless network connection can then be used to communicate any number of commands to the device. For example, while in the wake state, the device can be instructed to perform a software update, the device can be provisioned with personal information associated with a purchaser or intended user of the device, or a personal message can be stored to the device to be presented when the device is powered on (e.g., "Happy Birthday, Mom! Love, Joe"). After updating the device software or provisioning the user information, another command is given to transition the device back into a sleep state to conserve battery life. In an example implementation, the wake state may be a low power wake state that enables the device to perform the requested functions, but such that the device consumes less power than when in a full operational state.

Illustrative Architecture

Figure 1:
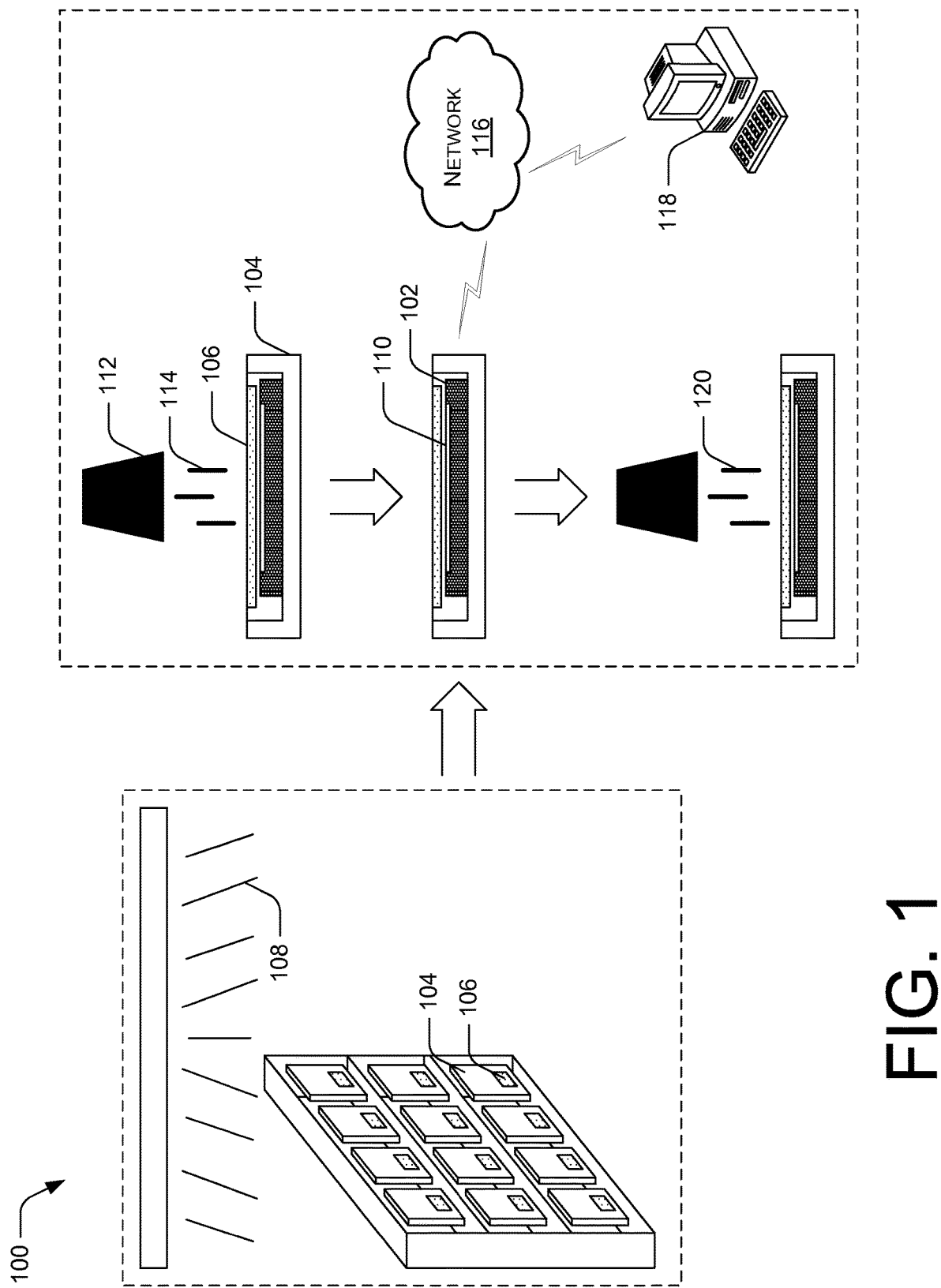
FIG. 1 is an overview showing illustrative aspects of an architecture in which in-package solar device charging and communication can be deployed.

FIG. 1 illustrates an example environment 100 in which in-package light-energy device communication can be implemented. A hand-held computing device 102 is packaged within a package 104 or other such container. The package 104 includes a light-transparent window 106, which allows light 108 to enter the package 104 and impinge upon an optical detector, such as a solar cell array 110 of a solar charging unit. In an example embodiment, a customer may purchase a handheld device, e.g., via an on-line marketplace. The details of the purchase may be sent to a fulfilment center that houses a plurality of such handheld devices. During the fulfilment process, a particular handheld device 102, from the plurality of handheld devices, may be selected to be shipped to the customer who made the purchase. Upon selection, the package 104 including the device 102 may be exposed to a light-emitting device 112. Light-emitting device 112 sends a particular pulse pattern of light 114 through the light-transparent window 106 of the container 104 to the solar charging unit 110 of the device 102. In response to the particular pulse pattern of light 114, the device 102 wakes from a sleep state and automatically connects to a wireless network 116. Another computing device 118 connected to the wireless network 116 sends one or more commands to the device 102 over the wireless network 116. The device responds to the commands to perform various tasks, such as, for example, updating software stored on the device or provisioning the device to maintain data associated with an intended user of the device. After the device has responded to the various commands received over the wireless network, the light-emitting device 112 sends a particular pulse pattern of light 120 through the light-transparent window 106 of the container 104 to the solar charging unit 110 of the device 102. In response to the particular pulse pattern of light 120, the device transitions back to a sleep state to conserve battery life. In an example implementation, rather than using light to signal the device 102 to transition back to a sleep state, computing device 118 sends a command over the wireless network 116 to the device 102, instructing the device 102 to transition back to the sleep state. In another example implementation, a plurality of packaged devices may be simultaneously transitioned from a sleep state to a wake state in response to a detected pulse pattern of light. For example, a light source 114 may emit the particular pulse pattern of light 114 to multiple packaged devices at the same time, resulting in each of the multiple packaged devices transitioning to a wake state.

Light-emitting device can be implemented as a component of a computing device (e.g., a portable computing device), or it can be implemented as an independent device that is programmable, directly or through communication with a computing device. The light-emitting device is programmed to emit one or more pre-configured patterns of light pulses, which may, for example, consist of a series of light pulses having varying intensities and/or varying durations. As an example, when a particular hand-held device is to be transitioned from a sleep state to a wake state, the light-emitting device is signaled (e.g., through a user-submitted command) to emit a particular pre-programmed pattern of light pulses that represents a command to wake the hand-held computing device.

Illustrative Packaging

Figure 2:
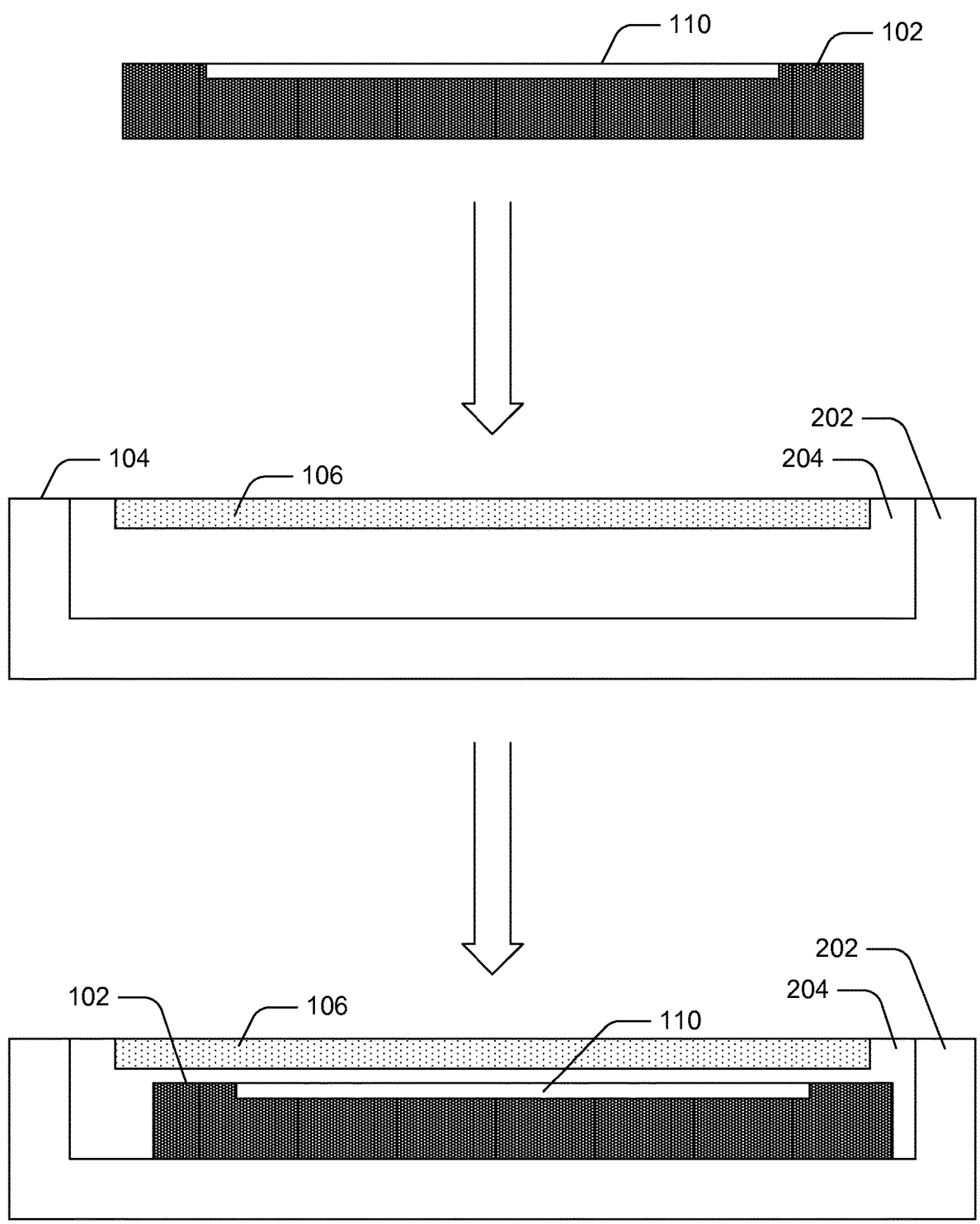
FIG. 2 is a pictorial diagram of an end cut-away view of an example box containing an example hand-held computing device.

FIG. 2 illustrates an end cut-away view of a package 104 containing a hand-held computing device 102 as described herein. Hand-held computing device 102 includes an optical detector, which may be implemented as any component capable of detecting patterns of light pulses. In the illustrated example implementation, the optical detector is implemented as a solar charging unit, which includes a solar cell array 110. One or more components of the solar charging unit may be implemented as integrated components of the hand-held computing device or may be implemented, for example, as components of a cover on the hand-held computing device. In an example implementation, rather than being an integrated component of the hand-held computing device, the solar cell array 110 may be a component of the package 104, which may be connected to the hand-held computing device while the hand-held computing device is housed within the package.

As illustrated in FIG. 2, when the hand-held computing device 102 is packaged, the hand-held computing device is housed in the cavity 204 of the container 104 such that the solar cell array 110 is proximate to the light-transparent window 106.

Figure 3:
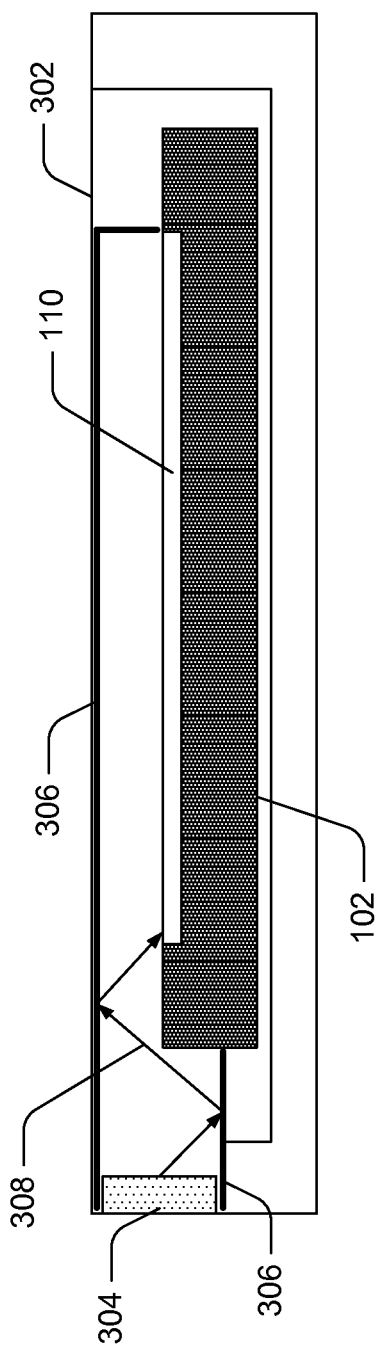
FIG. 3 is a pictorial diagram of an end cut-away view of an example box containing an example hand-held computing device, the box including a light guide.

FIG. 3 illustrates an alternate container 302 in which, when packaged, the solar cell array 110 (or other type of optical detector) of the hand-held computing device 102 is not necessarily proximate to the light-transparent window 304. In the illustrated example, the container 302 includes a light-transparent window 304 on a side or end of the container. In an example implementation, container 302 may include multiple light-transparent windows at various locations along the outside perimeter of the container 302. The container 302 further includes a light guide 306 that directs light 308 received through the light-transparent window 304 to a location proximate to the solar cell array 110. For example, a light guide 306 may consist of one or more reflective surfaces placed at various angles within the container to bounce light received through the light-transparent window along a path that leads to the solar cell array of the hand-held computing device.

The optical detector of hand-held device 102 can be implemented to detect light within a particular range of wavelengths. For example, an optical detector may be implemented to detect light having a wavelength between 200 nanometers and 800 nanometers. As other examples, an optical detector may be implemented to detect visible light (having wavelength between 380 nanometers and 750 nanometers), ultra-violet light (having wavelength greater than 750 nanometers), or infrared light (having wavelength between 10 nanometers and 400 nanometers). Similarly, the light-transparent window (e.g., light-transparent windows 106 or 304) may be fabricated to allow light of certain wavelengths to pass through the light-transparent window. For example, a light-transparent window can be fabricated from a material that allows visible light (having wavelength between 380 nanometers and 750 nanometers) to pass through the light-transparent window, ultra-violet light (having wavelength greater than 750 nanometers) to pass through the light-transparent window, or infrared light (having wavelength between 10 nanometers and 400 nanometers) to pass through the light-transparent window. The light-transparent window can be fabricated from a variety of materials including, but not limited to, glass, acrylic, or ethylenetetrafloruoethylene (ETFE). In an example implementation, the light-transparent window may appear opaque or semi-opaque to the human eye, but still allow light that is detectable by the optical detector to pass through the light-transparent widow.

Illustrative Operation

Figure 4:
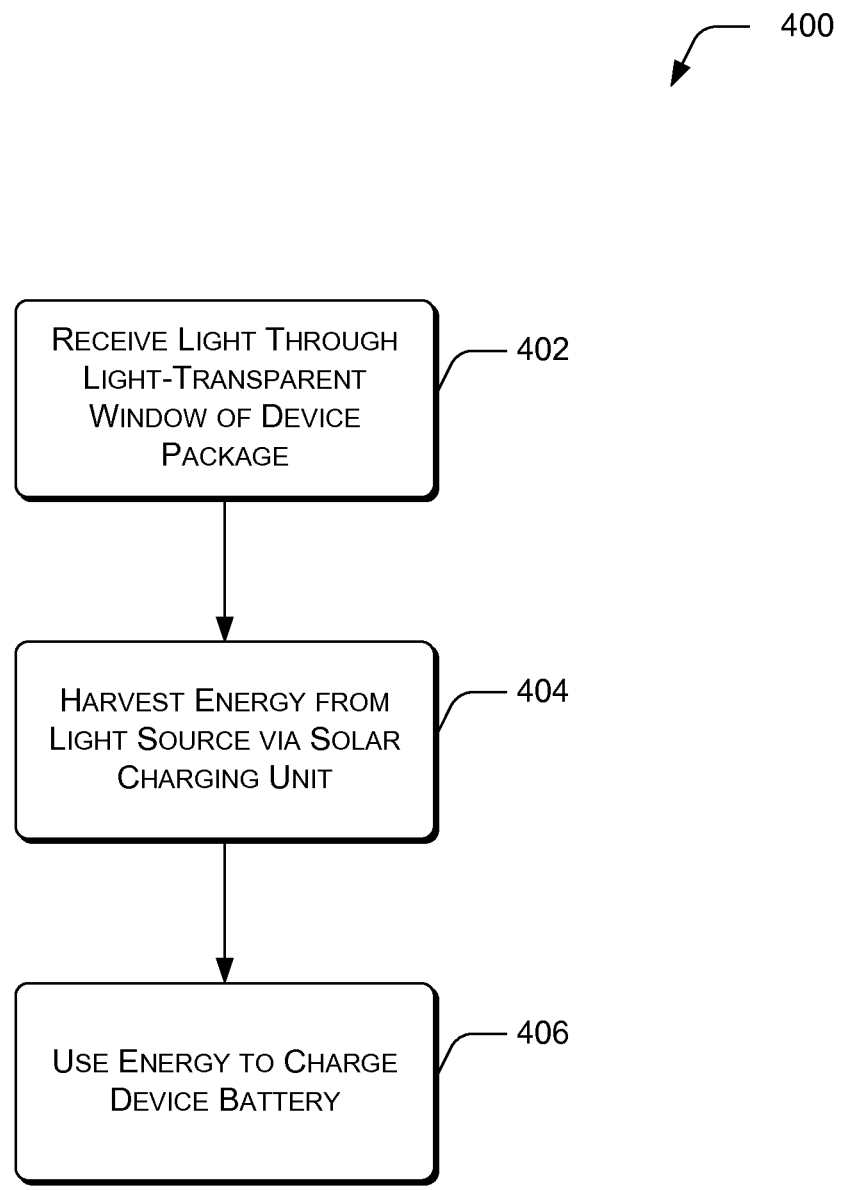
FIG. 4 is a flow diagram showing an illustrative process of in-package solar device charging.

An optical detector 110 facilitates in-package light-energy device communication. When implemented as a solar charging unit, optical detector 110 also facilitates in-package solar device charging. For example, FIG. 4 is a flow diagram showing an illustrative process 400 of in-package solar device charging according to at least one embodiment.

In process 400, at 402, light is received through a light-transparent window of a device package. For example, as illustrated in FIGS. 1 and 2, light travels through light-transparent window 106 to solar cell array 110. As another example, as illustrated in FIG. 3, light travels through light-transparent window 304, through light guide 306, to solar cell array 110. At 404, the solar charging unit harvests energy from the light that is received. At 406, the harvested energy is used to charge a battery of the hand-held computing device. For example, the solar charging unit includes an integrated circuit that enables a battery of the device to receive the energy that has been harvested.

Figure 5:
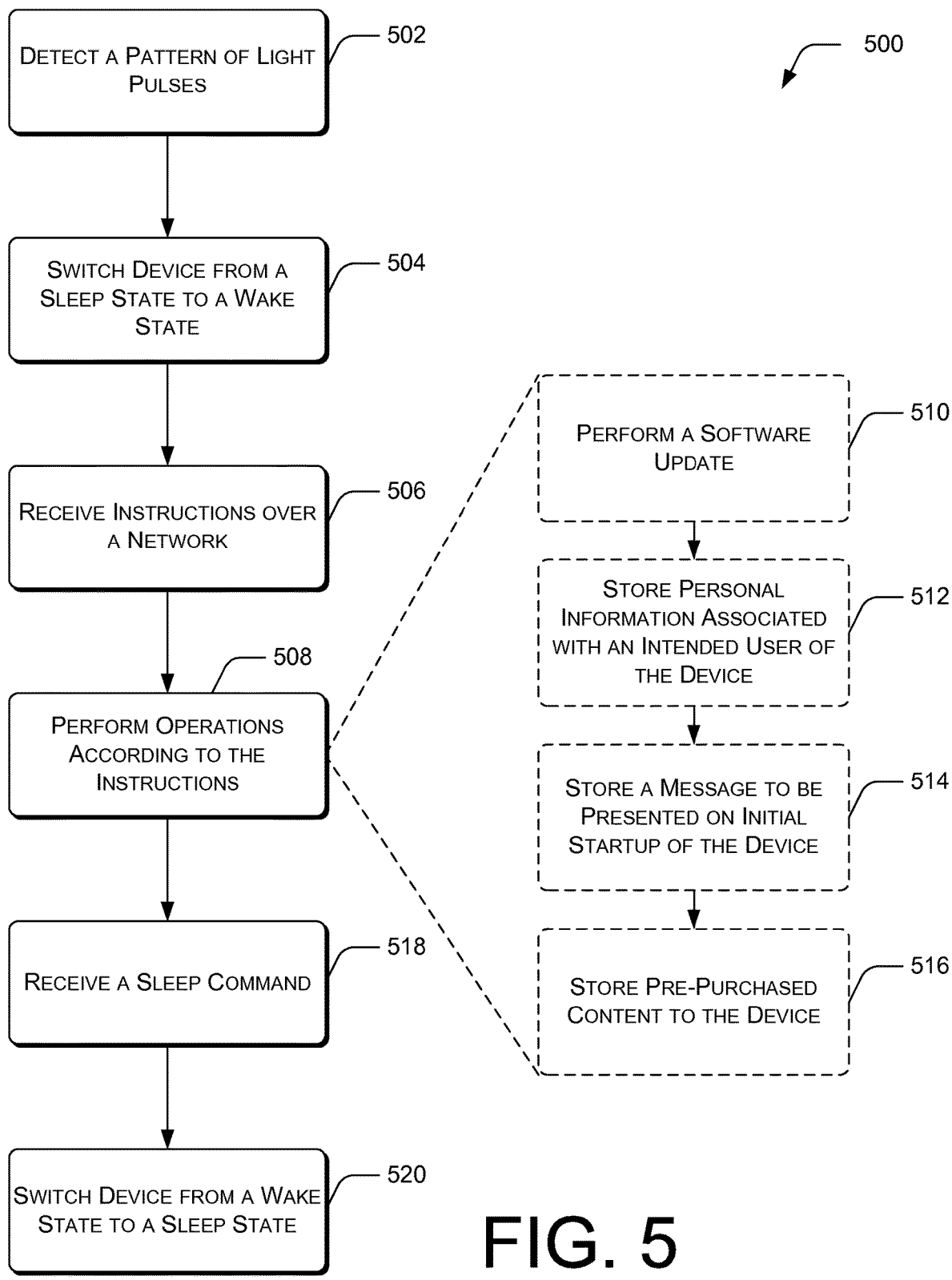
FIG. 5 is a flow diagram showing an illustrative process of in-package solar device communication.

FIG. 5 is a flow diagram showing an illustrative process 500 of in-package light-energy device communication. At 502, a pattern of light pulses received via the optical detector 110 is detected. In at least one embodiment, a solar cell array 110 is constructed using positive (p-type) and negative (n-type) semi-conductor materials, such as doped silicon. Electrical conductors attached to the positive and negative sides of the solar cell array allow external current flow through a load. When photons (i.e., light) come in contact with the solar cell array, electrons are freed and holes form. The freed electrons and the holes migrate toward the negative and positive sides, respectively. The electron flow provides a current, and the electric field generates a voltage, which is measureable as an output from the solar cell array. The bandgap of the semi-conductor material defines an upper limit of voltage that can be generated by a solar cell. Combining solar cells in series (as a solar cell array) can increase the output voltage. Solar cells combined in parallel (as a solar cell array) allow for greater current capabilities. Intensity (i.e., brightness) and duration of light can affect the output of the solar cell array in that, the more photons come in contact with the solar cell array, the more electron/hole pair form, which increases the current and measurable voltage. Accordingly, differences between multiple voltage and current measurements from the solar cell array directly correspond to changes in intensity or duration of light to which the solar cell array is exposed.

A micro-controller chip measures the voltage of the solar cell array. The micro-controller chip is programmed to detect a pre-defined pattern of light pulses based on variances in the measured voltage of the solar cell array over time. For example, bright light (i.e., light having a greater intensity) causes a more rapid voltage increase in the solar cell array than dim light. Similarly, voltage will increase more when the solar cell array is exposed to light for a longer duration than when exposed to light for a shorter duration. In some embodiments, the pre-defined pattern of light pulses may be a series of light pulses of pre-defined durations, a series of light pulses of pre-defined intensities, or a series of light pulses of pre-defined durations and intensities. The durations may be defined in terms of literal durations (e.g., a pattern consisting of a 0.2 second pulse, a 0.5 second pulse, and a 0.2 second pulse) or may be defined in terms of relative durations (e.g., a pattern consisting of a short pulse, a longer pulse, and a shorter pulse). Similarly, the intensities of a pattern may also be defined in terms of literal intensities (e.g., a pattern consisting of a 150 lux pulse, a 300 lux pulse, and a 150 lux pulse) or may be defined in terms of relative intensities (e.g., a pattern consisting of a bright pulse, a dim pulse, and a bright pulse). A pattern of light pulses may be defined as any combination of relative or literal light durations and relative or literal light intensities.

The micro-controller chip is programmed to detect a pattern of measured voltages that results from exposure to the pre-defined pattern of light pulses. For example, the micro-controller chip takes multiple voltage measurements from the solar cell array over a period of time. The micro-controller chip determines that a pre-defined pattern of light pulses has been received based on differences between the multiple voltage measurements, which correspond to differences between light pulses of the pre-defined pattern of light pulses.

At 504, the hand-held computing device is switched from a sleep state to a wake state. For example, when the micro-controller chip detects a pre-defined pattern of light pulses indicating that the device is to be switched to a wake state, the micro-controller chip transmits a signal to a processor of the device. The processor receives the signal and transitions the device to a wake state.

At 506, the hand-held computing device receives instructions over a network. For example, instructions are received from another computing device 118 over the wireless network 116. At 508, the hand-held computing device performs operations according to the received instructions. Example operations that may be performed at 508 are illustrated as optional blocks 510, 512, 514, and 516.

At 510, hand-held computing device 102 performs a software update. For example, at block 506, hand-held computing device 102 receives an instruction to perform a software update. In an example implementation, the instructions may include a network location from which the software update may be retrieved. The device accesses the indicated network location, retrieves the software update, and updates software stored on the device.

At 512, personal information associated with an intended user of the device is stored. For example, at block 506, hand-held computing device 102 receives an instruction to populate user data on the device. In an example implementation, the instruction includes data to be stored, as received, for example, from a purchaser of the device.

At 514, a message to be presented on initial startup of the device is stored. For example, at block 506, hand-held computing device 102 receives an instruction to store a logon message. In an example implementation, the instruction includes a message to be stored on the device, as received, for example, from a purchaser of the device 102.

At 516, pre-purchased content is stored to the device. For example, at block 506, hand-held computing device 102 receives media content (e.g., a book, a game, a movie, etc.) or instructions to download media content that has been purchased in conjunction with the device. In response, the media content is downloaded and stored on the device.

At 518, the device receives an instruction to transition from the wake state to a sleep state. In at least one example, the device receives the instruction to transition to the sleep state over the network, for example, similar to receipt of instructions to update software or other data on the device. In other examples, the command to transition to the sleep state is received in the form of a pre-defined pattern of light pulses, similar to the command to transition from the sleep state to the wake state. A light-based command to transition from the wake state to the sleep state may consist of a same pattern of light pulses as used to issue a command to wake the device, in which case the pre-defined light pattern functions as a toggle switch to transition the device between the wake state and the sleep state. Alternatively, the pre-defined pattern to transition the device from the wake state to the sleep state may be different from the pattern to the transition the device from the sleep state to the wake state.

At 520, the hand-held computing device is switched from a wake state to a sleep state. In one example, a processor of the device receives a command to transition to a sleep state via an instructions received over a network. For example, after instructing the device to update data on the device, computing device 118 sends an instruction to place the device in a sleep state over network 116. In another example, rather than receiving the sleep command over the network, the micro-controller chip takes multiple voltage measurements of the solar cell array over time, and detects a change in voltage that corresponds to a pre-defined pattern of light pulses indicating that the device is to be switched to a sleep state. In response to detecting the change in voltage, micro-controller chip transmits a signal to the processor of the device. The processor receives the signal from the micro-controller chip and transitions the device to a sleep state.

Illustrative Hand-Held Computing Device

Figure 6:
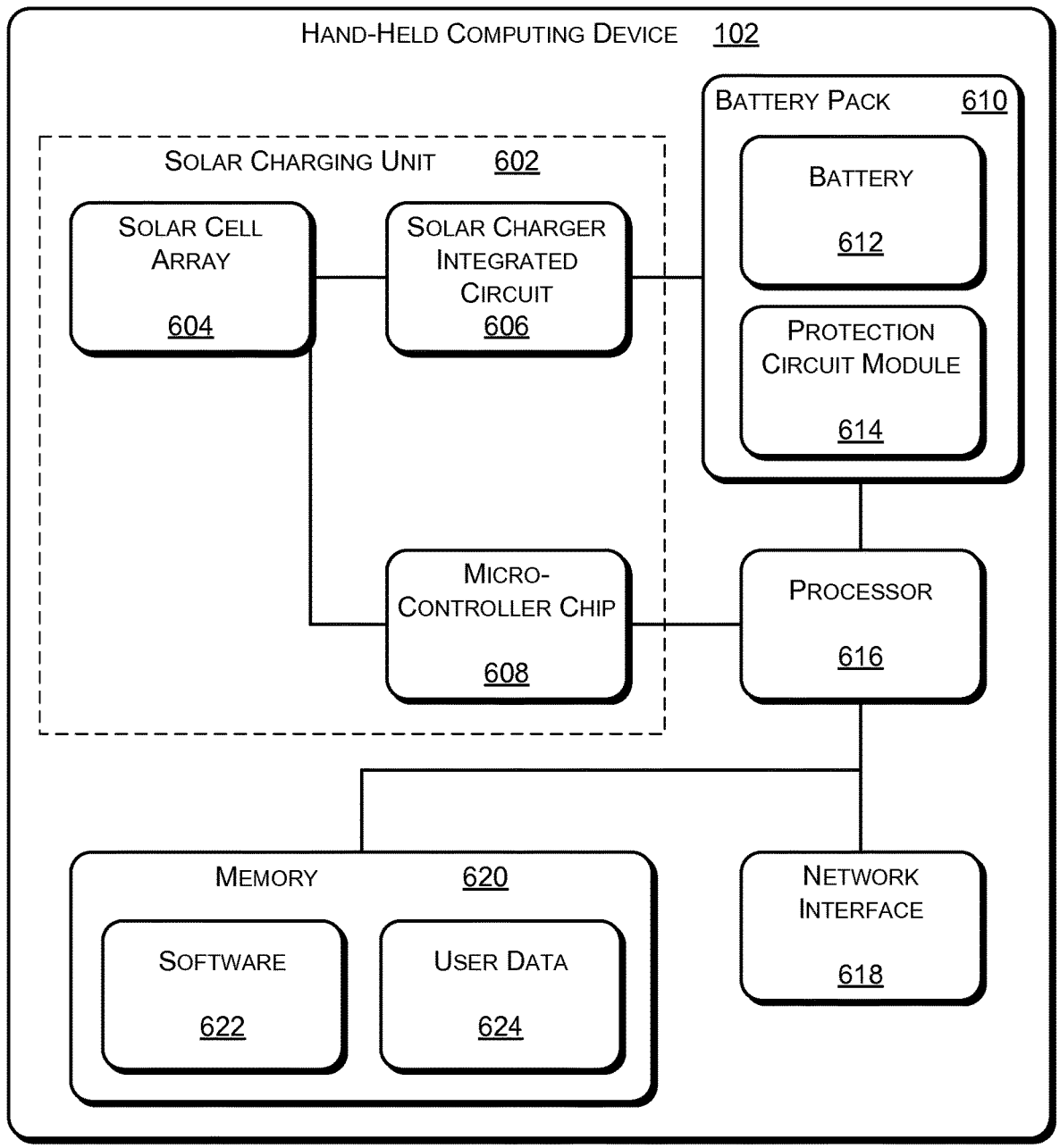
FIG. 6 is a block diagram illustrating select components of an example hand-held computing device.

FIG. 6 illustrates select components of an example hand-held computing device 102. Hand-held computing device 102 includes an optical detector, illustrated in FIG. 6 as solar charging unit 602. Solar charging unit 602 includes a solar cell array 604, which is connected to a solar charger integrated circuit 606 and a micro-controller chip 608. As described above with reference to FIG. 5, micro-controller chip 608 measures the voltage of the solar cell array 604. Micro-controller chip 608 determines whether or calculates differences in voltage measurements over time, and determines whether or not the voltage differences correspond to a particular pre-defined light pattern. If the differences between multiple voltage measurements do not correspond to a pre-defined light pattern, then micro-controller chip 608 allows the solar charging unit to initiate a charge to battery pack 610, which includes a battery 612 and a protection circuit module 614. Solar charger integrated circuit 606 controls the energy that is passed through to the battery pack 610, for example, to prevent overcharging of the battery 612. In an example implementation, solar charger integrated circuit 606 prevents the battery 612 from charging over 80% of capacity via energy from the solar charging unit 602. This provides a sufficient charge to provide a positive out-of-the-box user experience without over-charging the battery. In an example implementation, an over-charge threshold (e.g., 80%) is configurable.

If the micro-controller chip 608 detects differences between multiple voltage measurements that correspond to a pre-determined pattern of light pulses, micro-controller chip 608 sends a signal to processor 616 instructing the processor to transition the hand-held computing device 102 between a wake state and a sleep state. For example, if a hand-held computing device is in a sleep state and micro-controller chip 608 detects differences in voltage measurements that correspond to a predefined wake pattern of light pulses, micro-controller chip 608 sends a signal to processor 616 instructing the processor to wake the device. Similarly, if the hand-held computing device 102 is in a wake state and micro-controller chip 608 detects differences in voltage measurements that correspond to a predefined sleep pattern of light pulses, micro-controller chip 608 sends a signal to processor 616 instructing the processor to place the device in a sleep state. In an example implementation, the wake pattern and the sleep pattern may be the same, effectively acting as a toggle switch between a sleep state and a wake state. In another implementation, the wake light wake pattern and the sleep pattern may be different such that, for example, if the wake pattern is received while the handheld computing device is in a wake state, no action is taken by the processor upon receipt of a signal to wake the device. Example patterns of light pulses that may be used to signal a command to transition a device between a wake state and a sleep state include, but are not limited to, light pulses of varying durations, light pulses of varying intensities, or any combination thereof.

In an example implementation micro-controller chip 608 is powered by solar cell array 604, which prevents current leakage from battery 612. Because solar cell array 604 only generates power when exposed to light, micro-controller chip 608 only receives power, and thus only monitors the voltage of the solar cell array 604, when the solar cell array 604 is exposed to light. When the hand-held computing device 102 transitions to a wake state, the device is powered by the battery 612.

When the hand-held computing device 102 is in the wake state, powered by battery pack 610, network interface 618 enables communication between the hand-held computing device 102 and one or more other computing devices (e.g., computing device 118) over a network (e.g., network 116).

Hand-held computing device 102 also includes memory 620, which maintains, for example, software 622 and user data 624. Software 622 represents, for example, an operating system and any number of software applications. User data 624 represents, for example, user profile information, login information, and the like. Memory 620 may include volatile memory (such as RAM), nonvolatile memory, removable memory, and/or non-removable memory, implemented in any method or technology for storage of information, such as computer-readable instructions, data structures, program modules, or other data. Also, the processor 616 may include onboard memory in addition to or instead of the memory 620. Some examples of storage media that may be included in memory 620 and/or processor 616 include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the processor 616.

CONCLUSION

Although the subject matter has been described in language specific to structural features and/or methodological acts, the subject matter defined in the appended claims is not necessarily limited to the specific features or acts described. Rather, the specific features and acts are disclosed as exemplary forms of implementing the claims. For example, in at least one embodiment, process 400 as discussed regarding FIG. 4, is performed independently of process 500 as discussed regarding FIG. 5. However, in other embodiments, process 400 may be performed in conjunction with process 500.

Processes described herein are illustrated as a collection of blocks in a logical flow graph, which represent a sequence of operations that can be implemented in hardware, software, or a combination thereof. In the context of software, the blocks represent computer-executable instructions stored on memory 620 that, when executed by one or more processors 616, configure a computing system to perform the recited operations. Generally, computer-executable instructions include routines, programs, objects, components, modules, data structures, and the like that perform particular functions or implement particular abstract data types. The order in which the operations are described is not intended to be construed as a limitation, and any number of the described blocks can be combined in any order and/or in parallel to implement the process. In various embodiments, the structures of the described architecture may exist independently, in tandem, or as part of an integrated or dispersed system. Furthermore in various embodiments, the described processes may be performed independently, sequentially, interleaved, or in parallel by the described or other architectures without deviating from the spirit of this disclosure.

What is claimed is:

1. A system comprising:
a package having a light-transparent window; and
an electronic device being disposed in the package, the electronic device comprising:
   a processor;
   a battery; and
   an optical detector comprising a micro-controller chip and a solar charging unit to receive light pulses through the light-transparent window, a first pre-defined pattern of light pulses representing a first command to transition the electronic device from a sleep state to a wake state, a second pre-defined pattern of light pulses representing a second command to transition the electronic device from the wake state to the sleep state, wherein the processor is configured to receive, via a network, a third command to update data on the electronic device, wherein the micro-controller chip is configured to transmit at least a first signal to the processor to transition the electronic device from the sleep state to the wake state based at least in part on receiving the first pre-defined pattern of light pulses, and wherein the solar charging unit causes the battery to be charged to a level that is less than or equal to an over-charge threshold.

2. The system as recited in claim 1, wherein the solar charging unit comprises:
a solar cell array to:
receive the first pre-defined pattern of light pulses;
generate a first voltage corresponding to the first pre-defined pattern of light pulses;
receive the second pre-defined pattern of light pulses; and
generate a second voltage corresponding to the second pre-defined pattern of light pulses; and
wherein the micro-controller chip is further configured to:
measure the first voltage generated by the solar cell array; and measure the second voltage generated by the solar cell array, wherein the first voltage is greater than the second voltage.

3. The system as recited in claim 2, wherein:
the first pre-defined pattern of light pulses has a first intensity value;
the second pre-defined pattern of light pulses has a second intensity value; and
the first intensity value is greater than the second intensity value.

4. The system as recited in claim 2, wherein:
the first pre-defined pattern of light pulses has a first duration;
the second pre-defined pattern of light pulses has a second duration; and
the first duration is greater than the second duration.

5. The system as recited in claim 1, wherein
the solar charging unit causes the battery to be charged while the electronic device is disposed in the package.

6. The system as recited in claim 1, wherein the light-transparent window is fabricated from at least one of:
glass;
acrylic; or
ethylenetetrafloruoethylene (ETFE).

7. The system as recited in claim 1, wherein the package further comprises a light guide to direct light received through the light-transparent window to the optical detector.

8. The system as recited in claim 1, wherein the light-transparent window allows light having a wavelength between 380 nanometers and 750 nanometers to pass through the light-transparent window.

9. The system as recited in claim 1, wherein the light-transparent window allows light having a wavelength greater than 750 nanometers to pass through the light-transparent window.

10. The system as recited in claim 1, wherein the light-transparent window allows light having a wavelength between 10 nanometers and 400 nanometers to pass through the light-transparent window.

11. The system as recited in claim 1, wherein the solar charging unit causes the battery to be charged to a predetermined amount of charge that allows the electronic device to be used for at least a predetermined amount of time.

12. A method comprising:
receiving, by a computing device comprising a battery and a solar charging unit, light energy via a light-transparent window of a package, wherein the computing device is disposed in the package, the computing device is in a sleep state, and the solar charging unit causes the battery to be charged to a level that is less than or equal to an over-charge threshold;
detecting, by the computing device, a first pre-defined pattern of light pulses that represents a first command to transition the computing device from the sleep state to a wake state, wherein the first pre-defined pattern of light pulses has a first duration;
transitioning the computing device from the sleep state to the wake state;
receiving, via a network, a second command to update data on the computing device;
detecting, by the computing device, a second pre-defined pattern of light pulses that represents a third command to transition the computing device from the wake state to the sleep state, wherein the second pre-defined pattern of light pulses has a second duration that is less than the first duration; and transitioning the computing device from the wake state to the sleep state.

13. The method as recited in claim 12, wherein the detecting includes:
measuring, by a micro-controller chip of the computing device, a first voltage generated by a solar cell, the first voltage corresponding to a first received light pulse of the first pre-defined pattern of light pulses; and
measuring, by the micro-controller chip, a second voltage generated by the solar cell, the second voltage corresponding to a second received light pulse of the second pre-defined pattern of light pulses.

14. The method as recited in claim 13, wherein the detecting further includes determining, by the micro-controller chip, that the first voltage is greater than the second voltage.

15. The method as recited in claim 12, further comprising:
while in the wake state, using a network interface of the computing device to connect to the network; and
receiving, via the network, the second command to update data stored on the computing device within the package.

16. The method as recited in claim 12, wherein the computing device comprises an optical detector including a micro-controller chip and a solar cell, and wherein the receiving the light energy includes measuring, by the micro-controller chip, a voltage generated by the solar cell.

17. A method comprising:
receiving, by an optical detector comprising a solar charging unit and a micro-controller chip of a hand-held computing device, light pulses via a light-transparent window of a package, wherein the hand-held computing device comprises a battery and is disposed in the package and the optical detector is exposed to the light-transparent window, the hand-held computing device is in a sleep state, and the solar charging unit causes the battery to be charged to a level that is less than or equal to an over-charge threshold;
detecting, by the optical detector within the package, a first pre-defined pattern of light pulses representing a first command to transition the hand-held computing device from the sleep state to a wake state;
transmitting, by the micro-controller chip to a processor of the hand-held computing device, a first signal to transition the hand-held computing device from the sleep state to the wake state based at least in part on receiving the first pre-defined pattern of light pulses;
transitioning the hand-held computing device within the package from the sleep state to the wake state;
receiving, by the processor via a network connection, a second command to update data stored on the hand-held computing device;
detecting, by the optical detector, a second pre-defined pattern of light pulses representing a third command to transition the hand-held computing device from the wake state to the sleep state; and
transitioning the hand-held computing device within the package from the wake state to the sleep state.

18. The method as recited in claim 17, wherein the hand-held computing device comprises a solar cell, and wherein the receiving the light pulses includes measuring, by the micro-controller chip, a voltage generated by the solar cell.

19. The method as recited in claim 18, wherein detecting the first pre-defined pattern of light pulses comprises:
receiving, by the solar cell, a third pre-defined pattern of light pulses having a first duration;

measuring a first voltage generated by the solar cell, the first voltage corresponding to the first duration;
receiving, by the solar cell, a fourth pre-defined pattern of light pulses having a second duration; and
measuring a second voltage generated by the solar cell, the second voltage corresponding to the second duration, wherein the second duration is greater than the first duration and the second voltage is greater than the first voltage.

20. The method as recited in claim 17, wherein to update the data includes receiving an instruction to include purchased media content in the data stored on the hand-held computing device.

\* \* \* \* \*